United States Patent
Eckert

(10) Patent No.: US 12,048,376 B2
(45) Date of Patent: Jul. 30, 2024

(54) KITCHEN CABINET HAVING A WORKTOP THAT COMPRISES A SINK AND AN INSERT

(71) Applicant: Bulthaup GMBH & CO. KG, Bodenkirchen (DE)

(72) Inventor: Marc Oliver Eckert, Bodenkirchen (DE)

(73) Assignee: Bulthaup GMBH & CO. KG, Bodenkirchen (DE)

( * ) Notice: Subject to any disclaimer, the term of this patent is extended or adjusted under 35 U.S.C. 154(b) by 0 days.

(21) Appl. No.: 17/269,828

(22) PCT Filed: May 29, 2019

(86) PCT No.: PCT/EP2019/063950
§ 371 (c)(1),
(2) Date: May 24, 2021

(87) PCT Pub. No.: WO2020/038619
PCT Pub. Date: Feb. 27, 2020

(65) Prior Publication Data
US 2021/0267366 A1     Sep. 2, 2021

(30) Foreign Application Priority Data
Aug. 20, 2018   (DE) .......................... 102018120232.6

(51) Int. Cl.
*A47B 77/06*     (2006.01)
*A47B 77/02*     (2006.01)
(Continued)

(52) U.S. Cl.
CPC ............ *A47B 77/06* (2013.01); *A47B 77/022* (2013.01); *E03C 1/186* (2013.01); *E03C 1/33* (2013.01)

(58) Field of Classification Search
CPC . E03C 1/33; E03C 1/186; E03C 1/048; A47B 77/022; A47B 77/06
(Continued)

(56) References Cited

U.S. PATENT DOCUMENTS 3,988,784 A * 11/1976 Reedy ..................... E03C 1/186
4/654
D266,281 S * 9/1982 Ellis .............................. D7/698
(Continued)

FOREIGN PATENT DOCUMENTS

| EP | 2868818 A1 * | 5/2015 | ............. A47J 47/20 |
| FR | 2652367 A1 | 3/1991 | |
| WO | WO-2009095738 A1 * | 8/2009 | ............... E03C 1/18 |

OTHER PUBLICATIONS

EP-2868818-A1 Machine Translation (Year: 2022).*
International Search Report and Written Opinion, PCT/EP2019/063950, European Patent Office, mailed Aug. 9, 2019.

*Primary Examiner* — David P Angwin
*Assistant Examiner* — William R Klotz
(74) *Attorney, Agent, or Firm* — MARSHALL, GERSTEIN & BORUN LLP

(57) ABSTRACT

The disclosure relates to a kitchen cabinet having a worktop (10) in which at least one sink (20, 40) embedded, at least one lateral wall of the sink being in the form of an inclined ramp (21, 41). An insert (30) provided on the ramp has a flat work surface (32) and a substructure (33), said substructure being designed such that it compensates for the inclination of the ramp in order to keep the work surface level.

13 Claims, 4 Drawing Sheets

Figure 1:
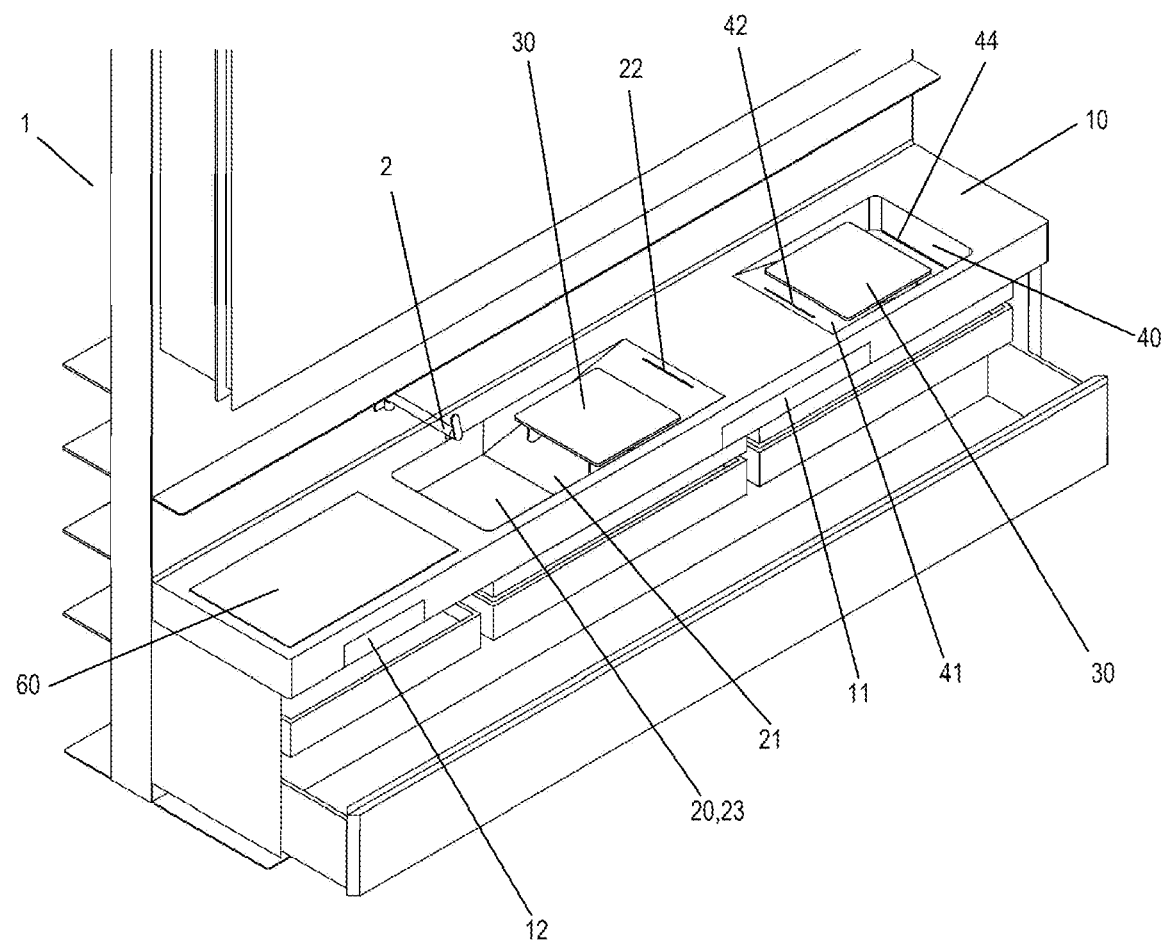

(51) Int. Cl.
*E03C 1/186* (2019.01)
*E03C 1/33* (2006.01)

(58) Field of Classification Search
USPC .............................................. 4/630, 675, 631
See application file for complete search history.

(56) References Cited

U.S. PATENT DOCUMENTS

| | | | | |
|---|---|---|---|---|
| 5,715,547 | A * | 2/1998 | Becker | D06F 1/02 |
| | | | | 4/619 |
| 7,854,030 | B2 * | 12/2010 | Lee | A47K 1/00 |
| | | | | 211/41.9 |
| 9,783,967 | B2 | 10/2017 | Jain et al. | |
| 2005/0044626 | A1 * | 3/2005 | Rocci | A47J 47/20 |
| | | | | 4/656 |
| 2005/0067747 | A1 * | 3/2005 | Erickson | A47B 77/06 |
| | | | | 269/127 |
| 2007/0074339 | A1 * | 4/2007 | Shamroth | E03C 1/186 |
| | | | | 4/631 |
| 2010/0275369 | A1 * | 11/2010 | Eilmus | A47J 47/005 |
| | | | | 4/631 |
| 2012/0124737 | A1 * | 5/2012 | Gibson | E03C 1/044 |
| | | | | 4/643 |
| 2013/0283521 | A1 * | 10/2013 | Jain | E03C 1/186 |
| | | | | 4/654 |
| 2017/0356173 | A1 * | 12/2017 | Loberger | E03C 1/0404 |

\* cited by examiner

KITCHEN CABINET HAVING A WORKTOP THAT COMPRISES A SINK AND AN INSERT

The invention relates to a piece of kitchen furniture having a worktop that comprises an especially configured sink and an insert for the sink.

It is known from the prior art to recess at least one sink on worktops of kitchen furniture. The sink is typically of tub shape and comprises a closable water drain at its base. The water inlet for the sink is typically arranged as a separate faucet above the sink.

If a flat work base such as in particular a cutting board is to be rinsed with water, it is necessary to lift the cutting board from the work surface, to hold it at an angle in the sink, to move it below the actuated faucet, and to subsequently remove it from the sink again and to place it onto the work surface. This procedure frequently has the result that water gets onto the work surface and is generally laborious.

It is the object of the invention to provide a concept with which the rinsing of a flat work base is simplified.

Against this background, the invention relates to a piece of kitchen furniture having a worktop in which a sink is recessed, wherein at least one side wall of the sink is formed as a slanted ramp, wherein an insert is provided that stands on the ramp and that comprises a flat work surface and a subframe, and wherein the subframe is configured such that it compensates the slant of the ramp to keep the work surface horizontal.

The flat work surface of the insert serves in an identical manner to a conventional cutting board as a base for typical kitchen work, for example cutting or kneading. The need of transferring the work surface into the sink and then out of the sink again on a rinsing of the work surface, is dispensed with by the arrangement of the work surface on an insert that is already arranged within the sink.

A water inlet can be arranged in the upper region of the ramp. In this case, water can run directly from the upper side of the ramp over the work surface without having to actuate and move a faucet above the sink. The water inlet can be elongate and can discharge water over an extended region of the width of the ramp. A full-area rinsing of the work surface is thus achieved on activation of the water inlet.

Provision is made in an embodiment that the subframe of the insert comprises at least two webs that extend in the direction of the upward slant of the ramp and whose lower edges are chamfered in a complementary manner to the upward incline. The webs can be arranged at oppositely disposed end regions at the lower side of the work surface to ensure a stable position of the insert on the ramp.

The insert can comprise a board at whose upper side the work surface is formed and at whose lower side the webs are fastened.

At least one adhesive element can be fastened to the lower edges of both webs to increase the friction between the lower edges and the ramp. Rubber platelets can be arranged at the oppositely disposed end regions of both ramps, for example.

The inclination angle of the ramp can be between 15° and 45°, preferably between 25° and 35°. The selection of the inclination angle in this range is advantageous. Too flat an inclination angle would, on the one hand, result in a difficult running off of waste matter and, on the other hand, in a very large surface requirement of the ramp with a low depth of the sink. Too large an inclination angle would, on the one hand, degrade the adhesion of the subframe on the ramp and would, on the other hand, decrease the horizontal surface of the ramp too much with sensible sink depths, which would automatically result in a restriction of the available area for the work surface.

The inclination angle of the ramp is preferably homogeneous over its total extent. The work surface thus remains horizontal, while the insert is displaced at the ramp.

The ramp is preferably perfectly planar over its total extent.

Provision is made in an embodiment that a drain is arranged below the ramp. The water running over the ramp and the work surface and any waste matter that is rinsed off can thus run directly into the drain. The drain can be elongate and can receive water over an extended region of the width of the ramp. The described direct draining over an extended region of the width of the sink is thus ensured.

Provision is made in an embodiment that the length of the work surface is smaller than the horizontal length of the ramp. It is achieved by this constellation that the insert can be displaced over a certain region along the ramp in order thus to be able to set its depth within the sink. A small immersion depth can be advantageous during work to have good access to the work surface, while a larger immersion depth can be desired during rinsing to prevent water from running off.

The sink can also have a flat sink base beside the ramp. Provision can alternatively be made that the ramp simultaneously represents a side wall and the total sink base.

Figure 2:
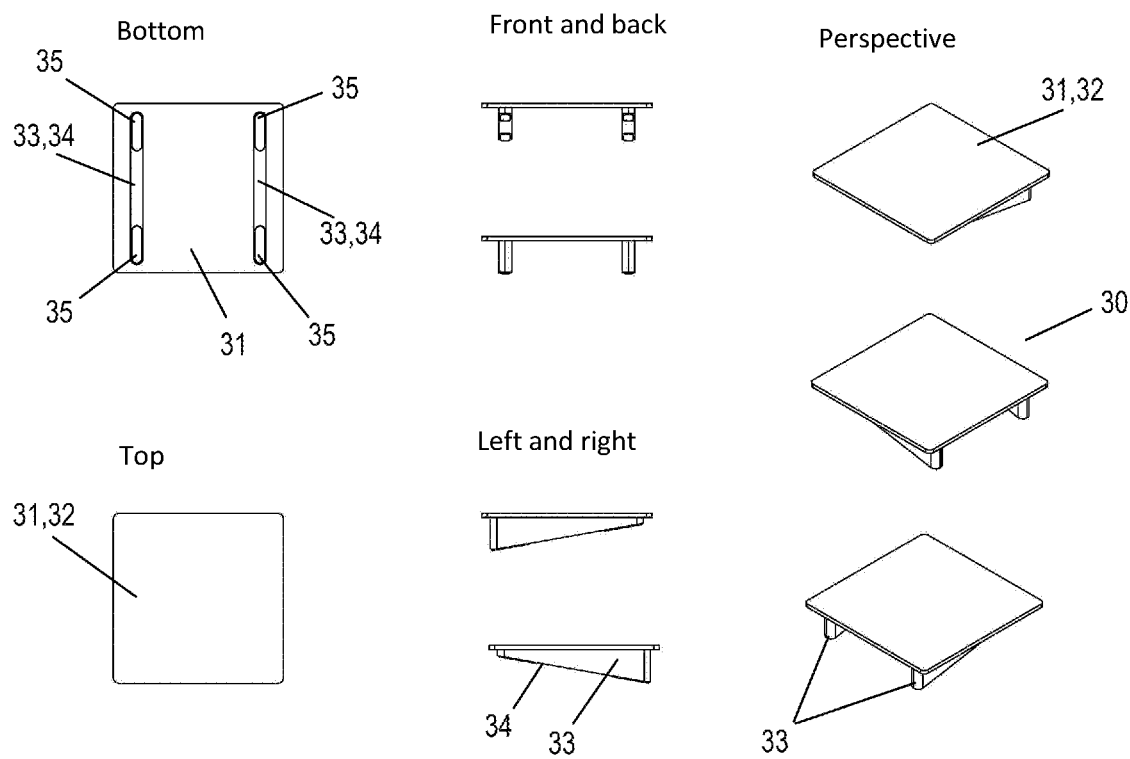
Figure 3:
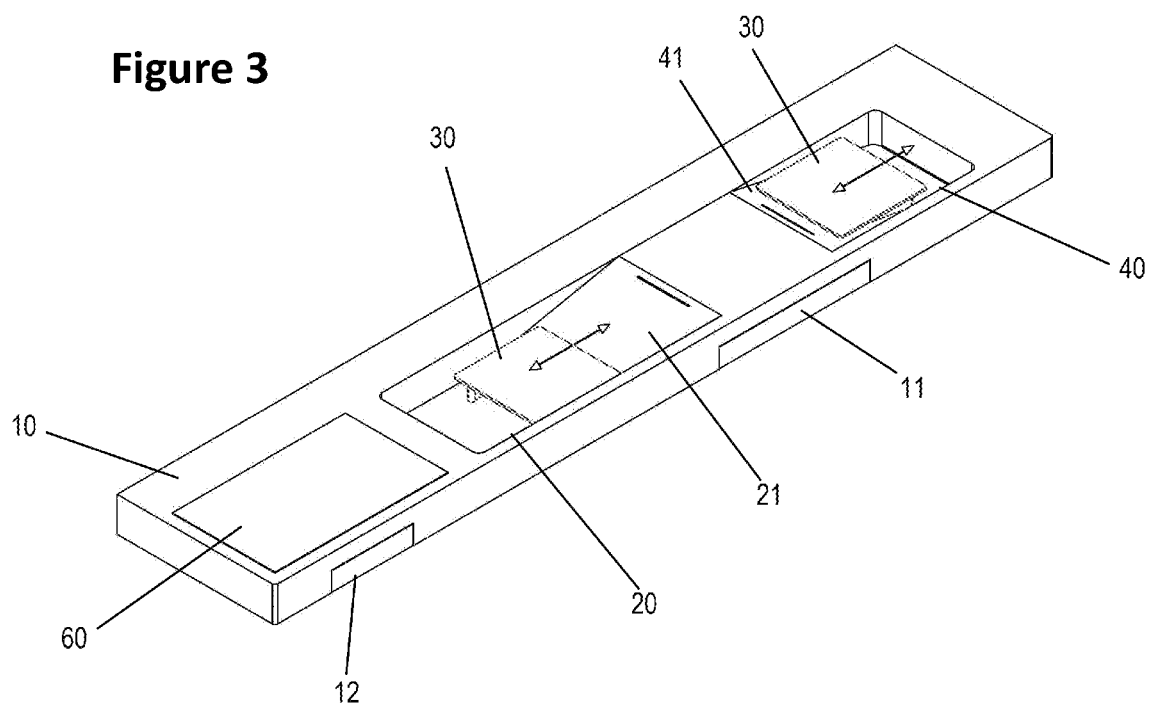
Figure 4:
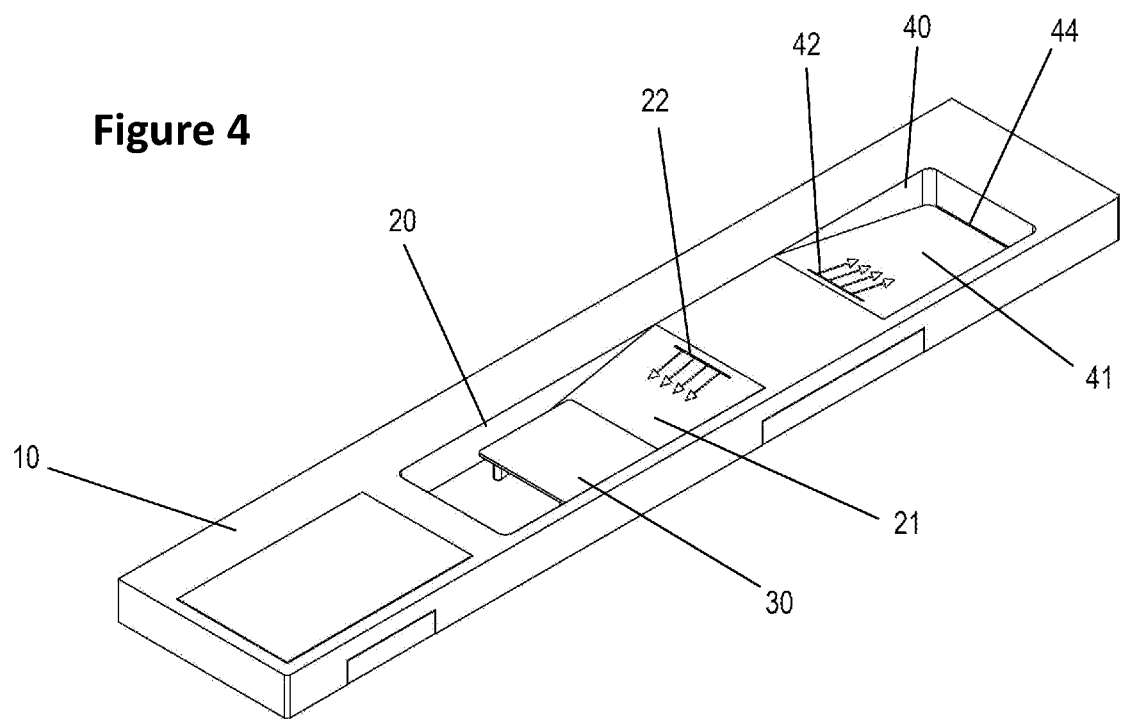

Further details and advantages of the invention result from the embodiments discussed in the following with reference to the Figures. There are shown in the Figures:

FIG. 1: a kitchen unit comprising a worktop having two sinks in accordance with the invention with insert;

FIG. 2: a detailed view of an insert;

FIG. 3: an isolated representation of the worktop, with a possible displacement of the inserts along the ramp being shown; and FIG. 4: a further isolated representation of the worktop, with an insert having been removed and the rinsing of the insert and of the ramp being shown.

A kitchen unit 1 is shown in FIG. 1 that inter alia comprises, beside further elements, a horizontal worktop 10 formed in accordance with the invention.

A first sink 20 and a second sink 40 are recessed in the worktop 10. The worktop additionally comprises a cooktop 60 as well as control elements 11 and 12 for the sinks 10 and 20 and for the cooktop 60.

A side wall of the first sink 20 that extends in the depth direction of the worktop 10 is shown as a ramp 21 having an upward slant of approximately 30°. A slit-shaped water inlet 22 is arranged at the upper end of the ramp 21 to be able to allow water to run down over the whole area of the ramp 21 where possible. The inclination angle of the ramp 21 is homogeneous over its total extent and the ramp 21 is additionally perfectly planar over its total extent.

The sink 20 additionally comprises a horizontal base 23 at which a drain, not shown in any more detail in the Figure, is arranged. The kitchen unit comprises a classical faucet 2 in the region above the base so that the sink 20 can also be used in the sense of a sink of the prior art.

A removable insert 30 is arranged at the ramp 21 and is shown in different views in an isolated position in FIG. 2. The insert 30 substantially comprises a board 31 at whose upper side a planar work surface 32 is formed and at whose lower side two webs 33 are fastened that extend in the upward slant direction of the ramp 21, that is in the longitudinal direction of the worktop 10. The lower edges 34 of the webs 33 are chamfered at an angle of approximately 30° in a complementary manner to the upward incline of the ramp. Two respective rubber plates 35 are additionally fastened at the lower edges 34 of both webs 33 to increase the friction between the lower edges 34 of the webs 33 and the ramp 21.

When the insert 30 stands on the ramp 31, the slant of the ramp 21 is compensated by the chamfered webs 33 and the work surface 32 is horizontal.

As can be recognized in FIG. 4, the insert 30 does not have to be moved for the rinsing of the work surface 32, but waste material can be rinsed directly toward to the outflow by activating the water inlet 22 in that water runs from the water inlet 22 at the upper side of the ramp 21 over the work surface 32 without having to actuate the faucet 2 above the sink 20. The water flow is indicated by arrows in FIG. 4.

The length of the board 31 and thus of the work surface 32 in the upward slant direction of the ramp 21, that is in the longitudinal direction of the worktop 10, is smaller than the horizontal length of the ramp 21. The insert 30 can thereby be displaced over a certain region along the ramp 21, as is indicated by the arrows in FIG. 3. The lowered depth of the insert 30 in the sink 20 can thus be set by displacement along the ramp 31 in a certain region.

A small lowered depth can be advantageous during work to have good access to the work surface 32. A larger immersion depth can be advantageous on the rinsing that can be recognized in FIG. 4 to prevent water from running out.

The work surface 32 of the insert 30 serves in an identical manner to a conventional cutting board as a base for typical kitchen work, for example cutting or kneading. The need of transferring the work surface 32 into the sink 20 and then out of the sink 20 again on a rinsing of the work surface 32, is dispensed with by the arrangement of the work surface on an insert 30 that is already arranged within the sink 20, as shown in FIG. 4.

The further sink 40 likewise comprises a side wall that extends in the depth direction of the worktop 10 and that is formed as a ramp 41 having an upward slant of approximately 30°. A slit-shaped water inlet 42 is also arranged at the upper end of the ramp 41 here and the above description of the ramp 21 also applies accordingly to the ramp 41. A removable insert 30 that is formed as described above is likewise arranged on the ramp 41. The functionality is likewise generally identical to that in the sink 20 as can also be seen from FIGS. 3 and 4.

The difference of sink 40 with respect to the sink 20 consists of the sink 40 not having a sink base and the ramp 41 simultaneously representing a side wall and the total sink base. A slit-shaped drain 44 is arranged at the lower end of the ramp 41 to drain waste water and any waste material rinsed off at the lower end of the ramp 41.

There is no classical faucet above the further sink 40.

It is understood that modifications of the shown embodiment are possible, for example to the extent that the sink 20 is formed as a classical sink or that the sink 40 is missing all together. The general configuration of the worktop 10 with respect to the presence or absence and the positioning of a cooktop 60, presence or absence and positioning of the control elements 11, and 12, positioning of the sinks 20 and 40, and the like is freely variable within the framework of the present invention.

The rinsing of the flat work surface 32 is decisively simplified over solutions from the prior art by means of the sinks 20 or 40 in accordance with the invention and the inserts 30.

The invention claimed is:

1. A piece of kitchen furniture having a worktop in which a sink has been recessed, comprising:
   at least one side wall of the sink formed as a slanted ramp;
   an insert that stands on the ramp and that comprises a flat work surface and a subframe, with the subframe being configured such that the subframe compensates the slant of the ramp to keep the work surface horizontal; and
   a water inlet arranged in an upper region of the ramp; wherein
   a water drain is arranged below the ramp, wherein
     the water drain is elongate and receives and drains water over an extended region of a width of the ramp,
     wherein the ramp has an inclination angle between approximately 15° and approximately 45° or between approximately 25° and approximately 35°,
     wherein the water inlet is slit-shaped to allow water to discharge over the extended region of the width of the ramp,
     wherein the subframe of the insert comprises at least two webs that extend in an upward slant direction of the ramp and whose lower edges are chamfered in a complementary manner to an upward incline and wherein at least one adhesive element is fastened to the lower edges of both webs to increase friction between the lower edges and the ramp,
     wherein the ramp comprises a first end, an inclined plane, and a second end opposite the first end, the inclined plane (i) ending at the first end of the ramp and the second end of the ramp and (ii) being positioned between the first end of the ramp and the second end of the ramp, wherein the lower edges of the two webs each comprises a first web end and a second web end, the first web end and the second web end to be positioned on the inclined plane of the ramp between the first end of the ramp and the second end of the ramp.

2. The piece of kitchen furniture in accordance with claim 1, wherein the water inlet is elongate and discharges water over the extended region of the width of the ramp.

3. The piece of kitchen furniture in accordance with claim 1, wherein the inclination angle of the ramp is homogeneous over a total extent of the ramp.

4. The piece of kitchen furniture in accordance with claim 1, wherein a length of the work surface is smaller than a horizontal length of the ramp.

5. The piece of kitchen furniture in accordance with claim 1, wherein the ramp has the inclination angle between approximately 15° and approximately 45°.

6. The piece of kitchen furniture in accordance with claim 1, wherein the ramp has the inclination angle of between approximately 25° and approximately 35°.

7. The piece of kitchen furniture in accordance with claim 1, wherein a length of the work surface is smaller than a horizontal length of the ramp.

8. The piece of kitchen furniture in accordance with claim 1, wherein the ramp has the inclination angle between approximately 25° and approximately 35° and wherein the inclination angle of the ramp is homogeneous over a total extent of the ramp.

9. The piece of kitchen furniture in accordance with claim 8, wherein a length of the work surface is smaller than a horizontal length of the ramp.

10. The piece of kitchen furniture in accordance with claim 1, wherein the water inlet is defined by the inclined plane and parallel to the first end of the ramp and to be positioned between the first end of the ramp and the first web end.

11. The piece of kitchen furniture in accordance with claim 10, wherein the two webs are each orthogonal triangles.

12. The piece of kitchen furniture in accordance with claim 11, wherein the sink has a first sink end and a second sink end, the water inlet and the first end of the ramp being positioned adjacent the first sink end and the water drain being positioned adjacent the second sink end, the water drain is positioned between the second sink end and the second end of the ramp and is positioned between the second sink end and the insert to be positioned on the ramp.

13. The piece of kitchen furniture in accordance with claim 12, wherein the two webs extend from the flat work surface, wherein the flat work surface overhangs the two webs.

\* \* \* \* \*